April 25, 1933.  A. MOORE  1,905,805
COMBUSTION CHAMBER CONSTRUCTION
Filed Aug. 26, 1930
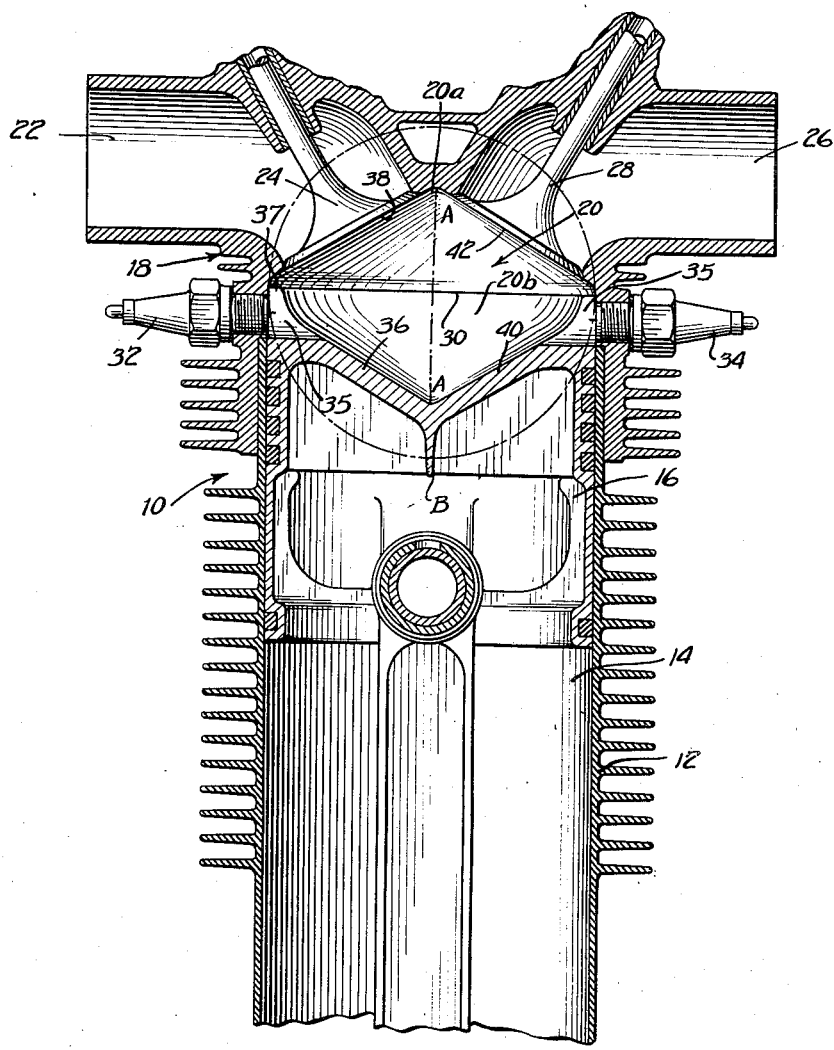
INVENTOR
*Arlington Moore*
BY
*Dyke and Schaines*
ATTORNEYS Patented Apr. 25, 1933

1,905,805

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

COMBUSTION CHAMBER CONSTRUCTION

Application filed August 26, 1930. Serial No. 477,857.

My invention relates to combustion chamber constructions for internal combustion engines, and particularly for aviation or valve-in-head engines, employing multiple ignition, and the same has for its object to provide a construction which reduces detonation or knocking by physically controlling the heat and flame propagation to prevent the development of auto-ignition temperatures and pressures.

Another object of the invention is to provide a construction of the character specified capable of simultaneously controlling the flame propagation from two or more ignition points for reducing or preventing detonation.

Another object of the invention is to provide a construction of the character specified in which the space available for thus controlling flame propagation originating at separated points is substantially confined to that having a maximum dimension not to exceed the diameter of the piston in length.

In the drawing:

The figure is a sectional elevation of one form of combustion chamber constructed according to and embodying my said invention.

The invention relates to combustion chamber constructions in which detonating pressures are prevented by causing the flame to propagate through a space or chamber which increases in cross-section in the direction of propagation, the invention residing particularly in the application of this principle to valve-in-head engines with multiple ignition.

Referring to the drawing, the engine 10 is of the valve-in-head form, such as that adapted for aviation, either of the radial or straight line type, one cylinder 12 of the several usually employed being illustrated.

The cylinder bore 14 with the piston 16 working therein is closed by a cylinder head 18, the two portions forming a combustion chamber 20 above the piston 16. The head 18 is formed with a passage 22 controlled by the inlet valve 24 for the delivery of the charge mixture into the cylinder and with a passage 26 controlled by exhaust valve 28 for the discharge of the exhaust gases from the cylinder.

The combustion chamber 20 is formed in part in the cylinder head 18 which has a tapering recess $20^a$ therein, and in part in the piston 16, which has a similar tapering recess $20^b$ therein, the valves 24 and 28 being disposed in downwardly diverging relation to each other to lie, when closed, substantially in the plane of the wall of the recess $20^a$. The two conical recesses $20^a$—$20^b$ in the top dead center position of the piston conjointly form the combustion chamber 20 which is of double conical formation in which the common base of the conical recesses $20^a$ and $20^b$, i. e., the maximum horizontal circular cross-section, indicated at 30, is substantially equal in diameter to that of the piston, the successive horizontal cross-section at opposite sides thereof decreasing in diameter.

Spark plugs 32 and 34 are received into the cylinder 12 at diametrically opposite points between the valves 24 and 28 and the piston 16 in the top center position thereof, said piston having clearance openings 35 therein receiving the spark plugs in the top dead center position of the piston. The recess $20^b$ in the piston, while of substantially the same angularity and depth as the recess $20^a$, is of slightly reduced diameter at the mouth thereof to form a relatively thickened flat edge 37 obviating sharp edges and preventing damage to the piston due to the intense heat. The spark plugs (two or more) are positioned in as close relation as possible to the plane 30 common to the bases of the two conical recesses at any point around the combustion chamber, which is symmetrical all around without interfering with the opening movement of the valves 24 or 28 or with the movement of the piston to top dead center position.

The flame waves upon the compression stroke are propagated from the spark plugs 32 and 34, located at points of maximum constriction through parts of the combustion chamber which continuously increase in cross-section rectilinearly towards a central or medial vertical plane, indicated by the line A—A which is normal to the line joining the spark plugs. Said line A—A may also indicate the common axis, joining the apices of the two conical recesses. For example, the flame from the spark plug 32 is propagated through a space defined by the diverging lines 36 and 38 and the flame from the spark plug 34 is propagated through a space defined by the diverging lines 40 and 42, the flame waves expanding substantially symmetrically or equally above and below the line 30.

The flame waves, because of the restricted space available in valve-in-head engines of high compression ratios, are preferably expanded in combustion chamber parts increasing in cross-section towards each other rectilinearly, i. e., without abrupt changes, such as could be effected with use of step formations, and such expansions being effected during travel of the flame front through a distance equal to one half of the diameter of the piston. The expansion required to prevent detonation must be accomplished during travel of this short distance.

The clearance volume, and hence the compression ratio, can be altered to that which is most suitable for the purpose by change in the angle of the recess $20^b$, or preferably by equally changing the angles of both recesses $20^a$ and $20^b$ to maintain the symmetrical relationship of the two combustion chamber portions $20^a$ and $20^b$. As the angles 36-40, 38-42 are varied the angles 36-38 and 40-42 vary in inverse relation.

However, the efficiency of the angles 36-38 and 40-42 in inducing proper flame wave expansion must not be sacrificed to obtain the desired compression ratio which can be otherwise obtained, as by making the apex of the recesses $20^a$ or $20^b$ more or less flat as required. The angles 36-38 or 40-42 therefore should never be so great that practically no expansion takes place in the distance traveled.

The expansion rate should be proportional to the distance traveled, i. e., uniform and rectilinear. I have found that good results in reducing detonation while operating with relatively high compression ratios can be obtained if the combustion chamber is designed so that the length of the axis A—A is always less than the diameter of the piston. The combustion chamber 20 lies entirely within a circle B having as its center the center of the line 30 and a diameter substantially equal to the piston diameter, the spark plugs preferably lying, when two are employed, close to the circumference of said circle as near the line 30 as practical. The divergence of the passages or parts through which the flame waves are propagated, as the clearance volume approaches a maximum for a given piston diameter, is thus always less than a right angle.

In my invention, therefore, the tapered or conical recesses $20^a$ and $20^b$ are, for all practical purposes, of substantially equal volumes, the combustion chamber parts $20^a$ and $20^b$ being symmetrical relative to the line 30 or the diameter of the circle B, one half of the combustion chamber lying on each side thereof, providing small clearance volume or high compression ratio, and, notwithstanding the small space available, effecting continuous expansion of the flame wave fronts during travel thereof through a distance equal to one half of the diameter of the piston, so that detonation is prevented.

The incoming charge passing the valve 24 into the cylinder and the exhaust gas passing the valve 28 from the cylinder have unobstructed passage. Greater radiation of heat through the piston head is effected because the surface thereof is of greater area than that of a flat piston. Further, less space is required in the cylinder head for a combustion chamber of a given compression ratio.

With the combustion chamber thus formed, it is possible to operate internal combustion engines with gasoline instead of benzol blends, and to use fuels heavier than gasoline without causing detonation.

Having thus described my invention, what I claim and desire to secure by Letters Patent is:

1. In an internal combustion engine, opposing portions having conical recesses therein diverging towards each other and forming a combustion chamber of double conical formation.

2. In an internal combustion engine, portions forming a combustion chamber of double conical formation, and ignition means located contiguous to the plane of the bases of the cones.

3. In an internal combustion engine, portions forming a combustion chamber of double conical formation, and plural ignition means located at diametrically opposite points contiguous to the plane of the bases of the cones.

4. In an internal combustion engine, a cylinder, a cylinder head therefor, a piston, said head and said piston having conical recesses therein forming in the top dead center position a double conical combustion chamber, and ignition means located at diametrically opposite points contiguous to the plane of the bases of said recesses.

5. In an internal combustion engine, a cylinder, a cylinder head therefor, a piston, said head and said piston having therein symmetrical conical recesses of substantially equal volume forming in the top dead center position of the piston a double conical combustion chamber, and spark plugs located at diametrically opposite points therein contiguous to the plane of the bases of the recesses, the combustion chamber parts increasing in cross-section rectilinearly from each spark plug to a common medial plane bisecting a line connecting the spark plugs.

6. In an internal combustion engine, a cylinder, a cylinder head therefor, a piston, said head and said piston having therein conical recesses forming in the top dead center position of the piston a double conical combustion chamber, and spark plugs located therein at diametrical opposite points contiguous to the plane of the bases of the recesses, said double conical combustion chamber having a maximum dimension substantially equal to the diameter of the piston and lying substantially entirely within a circle having said maximum dimension as a diameter.

7. In an internal combustion engine, a cylinder, a cylinder head therefor having a conical recess therein, intake and exhaust valves in said head disposed in downwardly diverging relation to each other in the plane of the wall of said recess, a piston having a conical recess therein, in the top dead center position of the piston, cooperating with said first named recess to form a double conical combustion chamber having a maximum dimension substantially equal to the diameter of the piston, and spark plugs disposed at the periphery of said combustion chamber intermediate said valves and said piston.

8. In an internal combustion engine, a cylinder, a cylinder head having a conical recess therein, intake and exhaust valves operating in said conical recess, a piston having a recess therein and clearance openings, said recesses forming a combustion chamber increasing in cross-section from peripheral points thereof towards the center, and spark plugs located at relatively constricted points thereof intermediate the valves and the piston and adapted to align with said clearance openings in top dead center position.

9. In an internal combustion engine, a cylinder, a cylinder head therefor, said head and said piston having therein conical recesses forming in the top dead center position of the piston a double conical combustion chamber, said double conical combustion chamber increasing in cross-section rectilinearly from the periphery of the common base thereof to a medial plane and having a maximum dimension substantially equal to the diameter of the piston and lying substantially entirely within a circle having said maximum dimension as a diameter, exhaust and intake valves in said head disposed in downwardly diverging relation to each other in the plane of the wall of the recess thereof, and ignition means contiguous to the plane of the bases of the recesses.

In testimony whereof, I have signed my name hereto.

ARLINGTON MOORE.